United States Patent
Evosevich et al.

(10) Patent No.: US 9,636,630 B2
(45) Date of Patent: *May 2, 2017

(54) GAS SEPARATION SYSTEMS AND METHODS USING MEMBRANES

(71) Applicant: The Boeing Company, Hungtington Beach, CA (US)

(72) Inventors: Barbara J Evosevich, Fullerton, CA (US); Ivana Jojic, Bellevue, WA (US)

(73) Assignee: THE BOEING COMPANY, Chicago, IL (US)

( * ) Notice: Subject to any disclaimer, the term of this patent is extended or adjusted under 35 U.S.C. 154(b) by 260 days.

This patent is subject to a terminal disclaimer.

(21) Appl. No.: 14/512,818

(22) Filed: Oct. 13, 2014

(65) Prior Publication Data

US 2015/0027305 A1     Jan. 29, 2015

Related U.S. Application Data

(63) Continuation of application No. 13/665,767, filed on Oct. 31, 2012, now Pat. No. 8,882,886.

(51) Int. Cl.
    *B01D 53/22*      (2006.01)
    *B64D 37/32*      (2006.01)
    (Continued)

(52) U.S. Cl.
    CPC ......... *B01D 53/226* (2013.01); *B01D 63/00* (2013.01); *B01D 63/02* (2013.01); *B01D 69/02* (2013.01);
    (Continued)

(58) Field of Classification Search
    CPC ...... B01D 53/226; B01D 63/00; B01D 63/02; B01D 69/02; B01D 69/08;
    (Continued)

(56) References Cited

U.S. PATENT DOCUMENTS

| 2,479,766 A | 8/1949 | Mulvany |
| 4,704,139 A | 11/1987 | Yamamoto et al. |

(Continued)

FOREIGN PATENT DOCUMENTS

| WO | WO0000389 | 1/2000 |
| WO | WO2005115123 | 12/2005 |

(Continued)

OTHER PUBLICATIONS

State Intellectual Property Office of PRC; Office Action issued in CN Patent Application No. 201380050974.4; dated Mar. 24, 2016, 18 pages.

(Continued)

*Primary Examiner* — Anthony Shumate
(74) *Attorney, Agent, or Firm* — Parsons Behle & Latimer

(57) ABSTRACT

A gas separation method includes contacting a membrane filter with gas feed, permeating the gas from the gas feed through the membrane, and producing filtered gas from the filter. The filtered gas is produced from the filter as a result of the membrane removing any hydrocarbons containing six or more carbon atoms to produce a total of 0.001 ppm w/w or less. A gas separation method includes feeding gas into a filter containing a hollow fiber membrane that exhibits the property of resisting degradation due to exposure to hydrocarbons containing six or more carbon atoms. The filter exhibits a pressure drop across the membrane of less than 5 psi. The method includes feeding the filtered gas into a gas separation module that exhibits a susceptibility to degradation from exposure to hydrocarbons containing six or more carbon atoms.

18 Claims, 1 Drawing Sheet

(51) Int. Cl.
*B01D 63/02* (2006.01)
*B01D 69/02* (2006.01)
*B01D 69/08* (2006.01)
*B01D 63/00* (2006.01)

(52) U.S. Cl.
CPC ............ *B01D 69/08* (2013.01); *B64D 37/32* (2013.01); *B01D 2053/224* (2013.01); *B01D 2325/28* (2013.01); *B01D 2325/30* (2013.01); *Y02T 50/44* (2013.01)

(58) Field of Classification Search
CPC .......... B01D 2053/224; B01D 2325/28; B01D 2325/30; B64D 37/32; Y02J 50/44
See application file for complete search history.

(56) References Cited

U.S. PATENT DOCUMENTS

| | | | |
|---|---|---|---|
| 5,032,148 A * | 7/1991 | Baker | B01D 53/226 62/624 |
| 5,332,424 A * | 7/1994 | Rao | B01D 53/229 62/624 |
| 6,585,192 B2 | 7/2003 | Beers | |
| 6,739,359 B2 | 5/2004 | Jones et al. | |
| 6,746,513 B2 | 6/2004 | Anderson | |
| 7,007,893 B2 | 3/2006 | Loss et al. | |
| 7,152,635 B2 | 12/2006 | Moravec et al. | |
| 7,172,156 B1 | 2/2007 | Jones | |
| 7,175,693 B2 | 2/2007 | Spadaccini et al. | |
| 7,179,322 B2 | 2/2007 | Lyons et al. | |
| 7,191,983 B2 | 3/2007 | Loss et al. | |
| 7,204,868 B2 | 4/2007 | Snow, Jr. | |
| 7,481,237 B2 | 1/2009 | Jones et al. | |
| 7,569,099 B2 | 8/2009 | Coffin et al. | |
| 7,601,203 B2 | 10/2009 | Reeve et al. | |
| 7,699,911 B2 | 4/2010 | Zhou et al. | |
| 8,245,978 B1 | 8/2012 | Beers et al. | |
| 8,882,886 B2 * | 11/2014 | Evosevich | B01D 63/02 95/43 |
| 2004/0000231 A1 | 1/2004 | Bikson et al. | |
| 2004/0000353 A1 | 1/2004 | Jones | |
| 2004/0000513 A1 * | 1/2004 | Colling | B01D 53/225 210/323.1 |
| 2004/0065383 A1 | 4/2004 | Jones et al. | |
| 2004/0065778 A1 | 4/2004 | Jones | |
| 2005/0173017 A1 | 8/2005 | Moravec et al. | |
| 2005/0224654 A1 | 10/2005 | Loss et al. | |
| 2006/0151669 A1 | 7/2006 | Jones | |
| 2006/0151670 A1 | 7/2006 | Loss | |
| 2007/0023577 A1 | 2/2007 | Jones | |
| 2008/0034964 A1 * | 2/2008 | Schmidt | B32B 27/00 95/12 |
| 2008/0271604 A1 | 11/2008 | Zhou et al. | |
| 2010/0021360 A1 | 1/2010 | Leenders et al. | |
| 2013/0239804 A1 * | 9/2013 | Wynn | B01D 53/229 95/39 |
| 2014/0053726 A1 | 2/2014 | Evosevich et al. | |
| 2014/0116249 A1 * | 5/2014 | Evosevich | B01D 63/02 95/47 |
| 2014/0171707 A1 | 6/2014 | Nyce et al. | |
| 2015/0360170 A1 * | 12/2015 | Evosevich | B64D 37/32 95/54 |

FOREIGN PATENT DOCUMENTS

| | | |
|---|---|---|
| WO | WO2005118073 | 12/2005 |
| WO | WO2006079782 | 8/2006 |
| WO | WO2014058515 | 4/2014 |

OTHER PUBLICATIONS

International Preliminary Report on Patentability for issued in PCT Application No. PCT/US2013/064380 dated May 5, 2015, 9 pages.
International Search Report and Written Opinion of the International Searching Authority issued in Application No. PCT/US2013/064380 dated Nov. 4, 2014, 13 pages.
Colken, Meredith, et al; "Development of an Experimental Database and Kinetic Models for Surrogate Jet Fuels;" AIAA 2007-770; 45th AIAA Aerospace Sciences Meeting and Exhibit; Jan. 8-11, 2007; Reno, Nevada Jan. 8, 2007, 21 pages.
Yang, Li, et al; Bio-inspired Onboard Membrane Sepratation of Water from Engine Oll; Jounral of Membrane Science; Elsevier; vol. 378, pp. 138-148; Apr. 28, 2011. Apr. 28, 2011.
Yang, L., et al. Abstract of "Bio-inspired Onboard Membraine Sepratation of Water from Engine Oil;" N. AM. Membrane Society, 21st Annual Meeting, Jun. 4-8, 2011; Las Vegas, Nevada. Jun. 4, 2011, 2 pages.
State Intellectual Property Office of PRC; Second Office Action for Application No. 201380050974.4 dated Oct. 31, 2016.

* cited by examiner

GAS SEPARATION SYSTEMS AND METHODS USING MEMBRANES

CROSS REFERENCE TO RELATED APPLICATIONS

This application is a continuation of U.S. patent application Ser. No. 13/665,767, filed Oct. 31, 2012, and entitled "Aircraft Fuel Tank Flammability Reduction Methods and Systems and Air Separation Methods Using Membranes," the disclosure of which is herein incorporated by reference.

TECHNICAL FIELD

The embodiments relate to gas separation systems and methods using membranes.

BACKGROUND

A variety of known systems exist with the purpose of reducing flammability in aircraft fuel tanks. Such systems may be known by a number of designations including, but not limited to, On-Board Inert Gas Generation System (OBIGGS), Nitrogen Generation System (NGS), Flammability Reduction System (FRS), Fuel Tank Inerting System (FTIS), etc. However, a commonality among the systems involves reducing the oxygen content of fuel tank ullage by feeding inert gas into the fuel tank. Often, the systems produce nitrogen-enriched air (NEA) for the inert gas. Air with lower percent oxygen is less flammable.

Inerting systems used to produce nitrogen-enriched air may rely on pressure swing absorption and desorption from media as a separation mechanism or diffusion through polymer membranes as another separation mechanism to remove oxygen. In systems with polymer hollow fiber membranes, compressed air enters the bore of the polymer hollow fiber and oxygen permeates through the polymer hollow fiber walls. The oxygen permeate is collected and exhausted overboard. The remaining nitrogen-enriched retentate flows through the bore and is collected at the air separation module product gas outlet for distribution to aircraft fuel tanks. Unfortunately, service life of the air separation module and the system operating conditions may be limited by the polymers used in construction of the gas separation module. Accordingly, increased reliability of air separation modules is desirable.

SUMMARY

In an embodiment, a gas separation method includes feeding pressurized gas into a filter containing a membrane, contacting the membrane with the gas feed, permeating the gas from the gas feed through the membrane, and producing filtered gas from the filter. Contaminants in the pressurized gas include hydrocarbons containing six or more carbon atoms. The filtered gas is produced from the filter as a result of the membrane removing any hydrocarbons containing six or more carbon atoms to produce a total of 0.001 parts per million by weight/weight (ppm w/w) or less. The method includes feeding the filtered gas into a gas separation module and producing gas enriched in a component of the gas feed from the gas separation module.

In another embodiment, a gas separation method includes feeding pressurized gas into a filter containing a hollow fiber membrane, contacting the hollow fiber membrane with the gas feed, permeating the gas from the gas feed through the membrane and producing filtered gas from the filter. Contaminants in the pressurized gas include hydrocarbons containing six or more carbon atoms. The hollow fiber membrane exhibits the property of resisting degradation due to exposure to the hydrocarbons. The filtered gas is produced from the filter as a result of the membrane removing hydrocarbons containing six or more carbon atoms. Further, the filter exhibits a pressure drop across the membrane of less than 5 psi. The method includes feeding the filtered gas into a gas separation module and producing gas enriched in a component of the gas feed from the gas separation module. The gas separation module exhibits a susceptibility to degradation from exposure to hydrocarbons containing six or more carbon atoms.

In a further embodiment, a gas separation system includes a source for gas, a filter configured to receive gas feed from the gas source, and a membrane in the filter. The membrane is configured to permeate the gas from the gas feed through the membrane at a pressure drop across the membrane of less than 5 psi and to produce filtered gas from the filter as a result of the membrane removing hydrocarbons containing six or more carbon atoms. The system includes a gas separation module configured to receive filtered gas from the filter and to produce gas enriched in a component of the gas feed from the gas separation module.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

Some embodiments are described below with reference to the following accompanying drawings.

DETAILED DESCRIPTION

Figure 1:
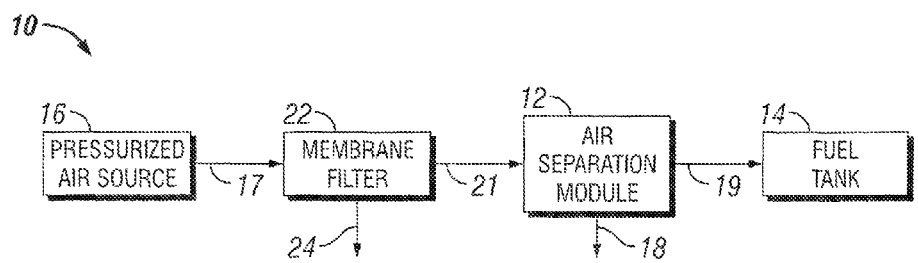
FIGS. 1-3 show diagrams of fuel tank flammability reduction systems according to several embodiments.

Known aircraft fuel tank flammability reduction systems include a pressurized air source, an air separation module (ASM) configured to receive air feed from the pressurized air source, and a fuel tank on board the aircraft configured to receive nitrogen-enriched air from the air separation module. Careful observation and evaluation has shown that known pressurized air sources available on aircraft, such as engine bleed air, may be contaminated with various gases (including hydrocarbon gases) and liquid or solid aerosols of various sizes. Larger particles may also be present. More particularly, engine bleed air has been demonstrated to contain residue and degradation products from jet fuel, engine lubricating oil, hydraulic fluid, de-icing agents, and other contaminants present in the atmosphere, on the ground, and at altitude. Predominant contaminants are hydrocarbons containing only hydrogen and carbon, but other hydrocarbons and other contaminants, such as aldehydes, ketones, acids, and other gases may be present. Gas separation membranes, in general, are very susceptible to large hydrocarbon molecules, degradation products of which were further shown to contain six or more carbon atoms.

Air separation modules (ASMs) known for use in aerospace contain hollow fiber membranes, which permeate oxygen through the membrane preferentially to nitrogen. The molecules that do not permeate are retained (retentate) and are called nitrogen-enriched air. However, in operating environments, ASMs exhibit loss of performance due to contamination and due to the natural relaxation for the fiber.

In some cases, ASMs exhibit decreased service life. Contaminants can negatively affect the polymer performance and life in several ways. Fiber pores can be plugged by particulates. Liquids can coat membranes (form a boundary layer), cause polymer swelling, or destroy membrane integrity. Polymer solvents could contribute to delamination of a polymer separation layer or within the separation layer and could lead to compaction (increase in separation layer thickness) or fiber deformation. Gasses can fill up free volume or, in significant levels, slowly accumulate to the membrane surface, decreasing permeation rate (especially heavy hydrocarbons with more than 15 carbon atoms). Gasses can cause plasticization or anti-plasticization at elevated concentrations or can reduce molecular weight of the polymer (break polymer chains). Additionally, polymer materials used to form hollow fiber membranes and other membranes may exhibit a susceptibility to degradation due to exposure to the hydrocarbons containing six or more carbon atoms.

Known aircraft fuel tank flammability reduction systems may include a particulate filter in an attempt to remove particles and/or include another filter, such as a liquid aerosols filter. However, known filters upstream of an ASM are not known to remove hydrocarbons containing six or more carbon atoms or small liquid or solid aerosols.

To maximize the available pressure and minimize system weight and maintenance, known aerospace systems utilize liquid and particulate filtration and account for the performance drop due to gaseous contamination (other than ozone) in the system design. Accordingly, it is not known for a filter upstream of an ASM to remove hydrocarbons containing six or more carbon atoms or small liquid or solid particles and also to exhibit a pressure drop of less than 5 pounds/inch$^2$ (psi). In a related manner, it is not known for such a filter to exhibit a high permeability.

Further, although hollow fiber membranes are known for use in an ASM for separation of oxygen from air, they are not known for use in other components of an aircraft fuel tank flammability reduction system, such as in a filter. It follows that a hollow fiber membrane in the ASM susceptible to contaminants received from the pressurized air source would also be susceptible to contaminants from the pressurized air source when functioning as a filter. Such a membrane in a filter may exhibit the same limited service life observed in the ASM. However, advances in material science for membranes functioning in applications other than aerospace show promise in exhibiting characteristics suitable for use in the filter upstream of an ASM.

Specifically, new materials may resist degradation due to exposure to hydrocarbons containing six or more carbon atoms. Although such materials might not function to effectively remove oxygen from air, they may function effectively as a membrane filter removing small liquid or solid particles and hydrocarbons containing six or more carbon atoms.

Consequently, a known material may be selected for use as a membrane in an ASM and designed to effectively remove oxygen from air. Examples of potentially suitable known polymers for such materials include polyphenylene oxide (PPO), polyimide, polysulfone, polycarbonate, and others, such as described in U.S. Pat. Nos. 8,245,978 issued to Beers and 7,699,911 issued to Zhou. Additionally, a material different from that of the ASM membrane may be used in a filter upstream of the ASM as a membrane to effectively remove contaminants. Accordingly, the membrane in the filter may be less susceptible to degradation from exposure to hydrocarbons containing six or more carbon atoms compared to the membrane in the ASM. Even so, the membrane in the ASM may be more effective in removing oxygen from air compared to the membrane in the filter. The different material in the membrane filter might not be previously known for such use. Contaminants remaining in the retentate of the membrane filter may be collected for some later use or vented, either alone or along with the permeate (oxygen) from the ASM.

Although the embodiments herein are discussed as significant in use along with a hollow fiber membrane ASM, they may also have applicability to other gas separation technologies. Also, although discussed herein in the context of aircraft fuel tank flammability reduction systems, other gas separation systems may benefit from the concepts in the described embodiments.

The described membrane filter may be placed downstream of a known filter. The described membrane filter may benefit from the removal of particles and/or liquid aerosols performed by a known filter. Service life of the membrane filter may thus be increased if positioned downstream of a known particulate and/or liquid aerosols filter. Additionally, or instead of using a known filter, the membrane filter may incorporate a sweep gas feature to assist in clearing the membrane of accumulated contaminants, such as is generally known.

Using one or more of the embodiments described herein, the service life of an ASM may be extended and system performance may increase by limiting membrane performance degradation due to gaseous contamination. Accordingly, ASMs may be sized smaller, saving weight and space. Currently, an ASM is often sized based on an end-of-life performance that accounts for performance degradation over time. With decreased degradation to the membrane due to contaminants described herein, a given surface area available for permeating oxygen may be maintained for a longer time. The longer life may decrease the surface area needed to reach the same service life as desired without the embodiments herein. Alternately, the same surface area may be used and an extended service life realized.

In known, non-aerospace applications, multiple filters may be staged to provide effective removal of contaminants upstream of an air separation system. The multiple filters add to system cost and maintenance time and may be eliminated or reduced in number relying on the embodiments herein. In non-aerospace applications, activated carbon is known for use as an adsorbent to remove unwanted hydrocarbons from an air source. However, activated carbon is considered unsuitable for use in aerospace applications given the need for regeneration and/or additional airplane maintenance cost of activated carbon filtration replacement. Additionally, membrane feed pressure may decrease due to the pressure drop through the activated carbon filter, which negatively impacts gas separation membrane performance. More weight and volume of activated carbon could be used to allow hydrocarbon removal without frequent regeneration and/or replacement. Accordingly, unless a large volume of activated carbon is provided, servicing and usefulness of the activated carbon as a hydrocarbon removal medium is severely limited.

As a result, instead of focusing on new materials to replace membranes in ASMs, the embodiments herein take the approach of retaining known technology with membrane materials susceptible to contaminants, but effective for air separation. Known technology may be combined with materials as a membrane filter unsuitable for $O_2/N_2$ separation (such as, high $O_2$ and $N_2$ permeability and low selectivity), but focused on not permeating higher molecular weight contaminants. The benefits of membrane technology may be achieved in both respects.

In an embodiment, an aircraft fuel tank flammability reduction method includes feeding pressurized air into a filter containing a membrane, contacting the membrane with the air feed, permeating oxygen and nitrogen from the air feed through the membrane, and producing filtered air from the filter. Contaminants in the pressurized air include hydrocarbons containing six or more carbon atoms. The filtered air is produced from the filter as a result of the membrane removing any hydrocarbons containing six or more carbon atoms to produce a total of 0.001 parts per million by weight/weight (ppm w/w) or less. The method includes feeding the filtered air into an air separation module and producing nitrogen-enriched air from the air separation module. The nitrogen-enriched air is fed into the fuel tank on board the aircraft.

By way of example, the filter may exhibit a pressure drop across the membrane of less than 5 psi. The membrane may exhibit the property of resisting degradation due to exposure to the hydrocarbons containing six or more carbon atoms. As one option, the membrane may include a hollow fiber membrane, which may be polymer-based. The ASM may also include a hollow fiber membrane. The hollow fiber membrane of the ASM may exhibit a susceptibility to degradation due to exposure to the hydrocarbons containing six or more carbon atoms. The method may further include operating a particulate filter that lacks a membrane upstream of the filter containing the membrane.

The susceptibility to degradation may decrease permeability due to gaseous contamination (other than ozone) and may vary by polymer. The higher the free volume of the polymer, the higher the performance, but also the higher the permeability drop due to contaminants because it includes more free volume to occupy. Using membrane filtration may increase the practicability of certain polymers in the ASM that would otherwise experience a permeability drop of about 20% or greater due to natural relaxation of the fiber and gaseous contamination. Without the described embodiments that include membrane filtration, such polymers may exhibit a high enough performance drop over the service life that it may not be practical to account for permeability loss in system sizing. Membrane polymers with a permeability drop that could practically be accounted for in the system design may still benefit from membrane filtration as discussed herein because the lower drop would positively affect the system component sizing.

In another embodiment, an air separation method includes feeding pressurized air into a filter containing a hollow fiber membrane, contacting the hollow fiber membrane with the air feed, permeating oxygen and nitrogen from the air feed through the membrane and producing filtered air from the filter. Contaminants in the pressurized air include hydrocarbons containing six or more carbon atoms. The hollow fiber membrane exhibits the property of resisting degradation due to exposure to the hydrocarbons. The filtered air is produced from the filter as a result of the membrane removing hydrocarbons containing six or more carbon atoms. Further, the filter exhibits a pressure drop across the membrane of less than 5 psi. The method includes feeding the filtered air into an air separation module containing a hollow fiber membrane and producing nitrogen-enriched air from the air separation module. The ASM hollow fiber membrane exhibits a susceptibility to degradation from exposure to hydrocarbons containing six or more carbon atoms.

By way of example, the filter membrane removes any hydrocarbons containing six or more carbon atoms to produce a total of 0.001 ppm w/w or less. Also, the method may include reducing aircraft fuel tank flammability using the nitrogen-enriched air.

In a further embodiment, an aircraft fuel tank flammability reduction system includes a source for air, a filter configured to receive air feed from the air source, and a membrane in the filter. The membrane is configured to permeate oxygen and nitrogen from the air feed through the membrane at a pressure drop across the membrane of less than 5 psi and to produce filtered air from the filter as a result of the membrane removing hydrocarbons containing six or more carbon atoms. The system includes an air separation module configured to receive filtered air from the filter and to produce nitrogen-enriched air from the air separation module. A fuel tank on board the aircraft is configured to receive the nitrogen-enriched air.

By way of example, the air source may be configured to provide pressurized air. The membrane may be configured to remove any hydrocarbons containing six or more carbon atoms to produce a total of 0.001 ppm w/w or less. The membrane may exhibit the property of resisting degradation due to exposure to the hydrocarbons containing six or more carbon atoms. As one option, the membrane may include a hollow fiber membrane, which may be polymer-based. The ASM may also include a hollow fiber membrane. The air separation module may include a hollow fiber membrane exhibiting a susceptibility to degradation from exposure to hydrocarbons containing six or more carbon atoms. The system may further include a particulate filter that lacks a membrane upstream of the filter containing the membrane.

FIG. 1 shows a diagram of a fuel tank flammability reduction system 10. In system 10, a pressurized air source 16 provides air feed 17 to a membrane filter 22. Membrane filter 22 produces filtered air 21 and retentate gas 24, containing contaminants removed from air feed 17. Membrane filter 22 may remove any hydrocarbons containing six or more carbon atoms to produce a total of 0.001 ppm w/w or less. Also, membrane filter 22 may exhibit a pressure drop across its membrane of less than 5 psi. Further, its membrane may exhibit the property of resisting degradation due to exposure to the hydrocarbons containing six or more carbon atoms. As an example, the membrane may be a hollow fiber membrane.

A downstream air separation module 12 receives filtered air 21 and produces nitrogen-enriched air 19 along with permeate gas 18. Air separation module 12 may include a hollow fiber membrane. The membrane may exhibit a susceptibility to degradation from exposure to hydrocarbons containing six or more carbon atoms. Given the removal of contaminants in retentate gas 24 by membrane filter 22, air separation module 12 is enabled to more effectively permeate oxygen through a membrane (not shown) and into permeate gas 18. Nitrogen-enriched air 19 is provided to a fuel tank 14 for flammability reduction.

Figure 2:
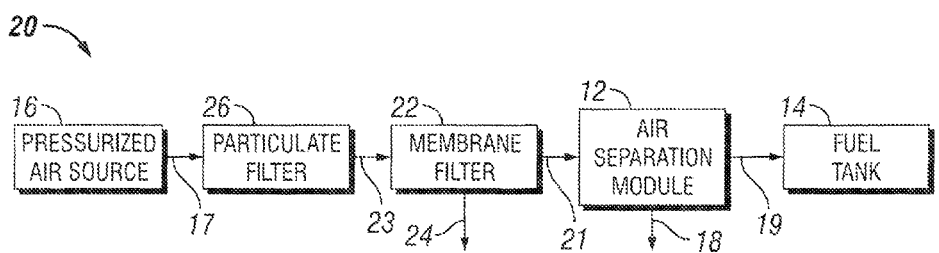

FIG. 2 shows a diagram of a fuel tank flammability reduction system 20 that includes all the elements of system 10, but further includes a particulate filter 26. Although not shown, particulate filter 26 may additionally function as a liquid aerosols filter or a separate liquid aerosols filter may be added to system 20 upstream or downstream of particulate filter 26. Particulate filter 26 provides filtered air 23 to membrane filter 22. In system 20, particulate filter 26 may prolong the service life of membrane filter 22 by removing contaminants such as large particles and liquid aerosols that may limit the effective surface area of the membrane (not shown) in membrane filter 22.

Figure 3:
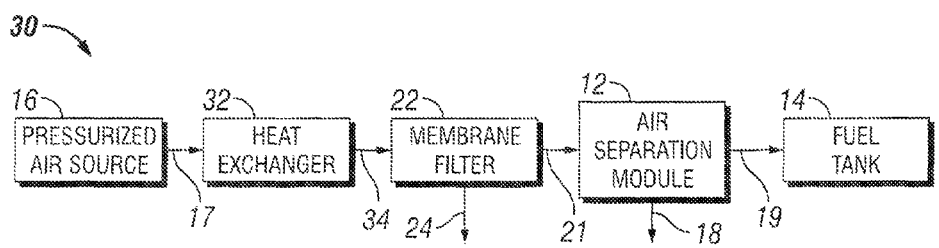

FIG. 3 shows a diagram of an aircraft fuel tank flammability reduction system 30 that includes all the elements of system 10 shown in FIG. 1, but additionally includes a heat exchanger 32. Often, known sources for pressurized air source 16 provides air feed 17 at an elevated temperature that may be unsuitable for the membrane in air separation module 12 and/or the membrane in membrane filter 22. Heat exchanger 32 may be used to produce cooled air feed 34 to reduce heat damage to membranes in downstream components. Alternatively, it is conceivable that pressurized air source 16 may provide air feed 17 at a temperature limiting the performance of membranes in downstream components because it is too cold. In such case, heat exchanger 32 may instead produce a heated air feed (not shown). It is further conceivable that the membrane in membrane filter 22 and the membrane in air separation module 12 might operate most efficiently in different temperature ranges. Accordingly, heat exchanger 32 may instead be positioned between membrane filter 22 and air separation module 12 or an additional heat exchanger may be provided to satisfy the temperature ranges of respective membranes. Even further, conceivably membrane filter 22 and air separation module 12 may include membranes operable at temperatures such that heat exchanger 32 may instead be located downstream of air separation module to cool nitrogen-enriched air 19 before being provided to fuel tank 14.

Although systems 10, 20, and 30 discussed above each include fuel tank 14, it is noted consistent with the discussion above that nitrogen-enriched air 19 may instead be provided to a different component of a different system, such as an air separation system. Although FIGS. 1-3 show various possible embodiments of systems described herein, it will be appreciated that further combinations of the features in FIGS. 1-3 and other features described herein are contemplated.

In compliance with the statute, the embodiments have been described in language more or less specific as to structural and methodical features. It is to be understood, however, that the embodiments are not limited to the specific features shown and described. The embodiments are, therefore, claimed in any of their forms or modifications within the proper scope of the appended claims appropriately interpreted in accordance with the doctrine of equivalents.

TABLE OF REFERENCE NUMERALS FOR FIGURES 10 system
12 air separation module
14 fuel tank
16 pressurized air source
17 air feed
18 permeate gas
19 nitrogen-enriched air
20 system
21 filtered air
22 membrane filter
23 filtered air
24 retentate gas
26 particulate filter
30 system
32 heat exchanger
34 cooled air feed

The invention claimed is:

1. A gas separation method comprising:
    feeding a pressurized gas feed into a filter containing a membrane, contaminants in the pressurized gas including hydrocarbons containing six or more carbon atoms;
    contacting the membrane with the gas feed, permeating the gas from the gas feed through the membrane, and producing filtered gas from the filter as a result of the membrane removing any hydrocarbons containing six or more carbon atoms to produce a total of 0.001 ppm w/w or less, the filter exhibiting a pressure drop across the membrane of less than 5 pounds/inch$^2$ (psi); and
    feeding the filtered gas into a gas separation module and producing gas enriched in a component of the gas feed from the gas separation module.

2. The method of claim 1 wherein the gas comprises air and the enriched component of the gas feed comprises nitrogen.

3. The method of claim 1 wherein the membrane exhibits a property of resisting degradation due to exposure to the hydrocarbons containing six or more carbon atoms.

4. The method of claim 1 wherein the membrane comprises a hollow fiber membrane.

5. The method of claim 1 wherein the gas separation module comprises a hollow fiber membrane.

6. The method of claim 5 wherein the gas separation module hollow fiber membrane exhibits a susceptibility to degradation from exposure to hydrocarbons containing six or more carbon atoms.

7. The method of claim 1 further comprising operating a particulate filter that lacks a membrane upstream of the filter containing a membrane.

8. A gas separation method comprising:
    feeding a pressurized gas feed into a filter containing a hollow fiber membrane, contaminants in the pressurized gas including hydrocarbons containing six or more carbon atoms and the hollow fiber membrane exhibiting a property of resisting degradation due to exposure to the hydrocarbons;
    contacting the hollow fiber membrane with the gas feed, permeating the gas from the gas feed through the membrane, and producing filtered gas from the filter as a result of the membrane removing hydrocarbons containing six or more carbon atoms, the filter exhibiting a pressure drop across the membrane of less than 5 pounds/inch$^2$ (psi); and
    feeding the filtered gas into a gas separation module and producing gas enriched in a component of the gas feed from the gas separation module, the gas separation module exhibiting a susceptibility to degradation from exposure to hydrocarbons containing six or more carbon atoms.

9. The method of claim 8 wherein the filter membrane removes any hydrocarbons containing six or more carbon atoms to produce a total of 0.001 ppm w/w or less.

10. The method of claim 8 wherein the gas comprises air and the enriched component of the gas feed comprises nitrogen.

11. A gas separation system comprising:
    a source for gas, the gas being mixed with hydrocarbons containing six or more carbon atoms;
    a filter configured to receive a gas feed from the gas source;
    a membrane in the filter, the membrane being configured to permeate the gas from the gas feed through the membrane at a pressure drop across the membrane of less than 5 pounds/inch$^2$ (psi) and to produce filtered gas from the filter as a result of the membrane removing the hydrocarbons containing six or more carbon atoms;

a gas separation module configured to receive filtered gas from the filter and to produce gas enriched in a component of the gas feed from the gas separation module.

12. The system of claim 11 wherein the gas source is configured to provide pressurized air.

13. The system of claim 11 wherein the membrane is configured to remove any hydrocarbons containing six or more carbon atoms to produce a total of 0.001 ppm w/w or less.

14. The system of claim 11 wherein the membrane exhibits a property of resisting degradation due to exposure to the hydrocarbons containing six or more carbon atoms.

15. The system of claim 11 wherein the membrane comprises a hollow fiber membrane.

16. The system of claim 11 wherein the gas separation module comprises a hollow fiber membrane.

17. The system of claim 15 wherein the gas separation module hollow fiber membrane exhibits a susceptibility to degradation from exposure to hydrocarbons containing six or more carbon atoms.

18. The system of claim 11 further comprising a particulate filter that lacks a membrane upstream of the filter containing the membrane.

* * * * *